United States Patent [19]

Schaefer et al.

[11] Patent Number: 5,154,532
[45] Date of Patent: Oct. 13, 1992

[54] RECIPROCATING PUMP COUPLING

[75] Inventors: Thomas J. Schaefer, Buffalo; Calvin S. Hulburt, Minneapolis, both of Minn.

[73] Assignee: Graco, Inc., Minneapolis, Minn.

[21] Appl. No.: 522,507

[22] Filed: May 14, 1990

Related U.S. Application Data

[63] Continuation of Ser. No. 308,040, Feb. 8, 1990, abandoned.

[51] Int. Cl.⁵ .............................................. F16B 7/18
[52] U.S. Cl. .................................... 403/301; 403/335; 403/342; 42/129
[58] Field of Search ............... 403/342, 343, 307, 299, 403/301, 310, 314, 334, 336, 335, 369, 371, 360, 338; 92/129

[56] References Cited

U.S. PATENT DOCUMENTS

| | | | |
|---|---|---|---|
| 580,214 | 4/1897 | Marvel | 403/343 X |
| 2,697,581 | 12/1954 | Ray | 403/342 X |
| 2,865,663 | 12/1958 | Shellman et al. | 403/310 X |
| 3,282,614 | 11/1966 | Entrikin | 403/301 X |
| 3,406,992 | 10/1968 | Grotness | 403/77 X |
| 3,492,032 | 1/1970 | Deike | 403/369 |
| 3,523,338 | 8/1970 | Aldred et al. | 403/342 X |
| 3,682,440 | 8/1972 | Walker | 403/343 X |
| 3,837,753 | 9/1974 | Weiste et al. | 403/343 X |
| 4,185,475 | 1/1980 | Kleinschmidt et al. | 403/342 X |
| 4,277,197 | 7/1981 | Bingham | 403/342 X |
| 4,329,124 | 5/1982 | Pridy | 403/343 X |
| 4,505,119 | 3/1985 | Pundak | 403/299 X |
| 4,573,712 | 3/1986 | Cameron | 403/299 X |
| 4,582,347 | 4/1986 | Wilcox et al. | 403/342 X |
| 4,650,363 | 3/1987 | Kehl et al. | 92/129 X |
| 4,707,890 | 11/1987 | Jose et al. | 403/371 X |
| 4,719,845 | 1/1988 | Dugan | 403/335 X |

Primary Examiner—Peter M. Cuomo
Attorney, Agent, or Firm—Douglas B. Farrow

[57] ABSTRACT

The reciprocating pump shaft is joined to a reciprocating motor shaft by the coupling of this invention. The pump shaft is provided with a knob-like end having a chamfered angle between the knob and a reduced diameter section adjacent the knob. A two piece annular collar that's about the chamfered shoulder and the reduced diameter section and the collar is provided with a chamfered shoulder having a slight angular mis-match with the shaft shoulder. A nut draws the pump shaft upwardly against the end of the motor shaft and is tightened to the point where the pre-load between the two shafts is greater than the alternating load imposed by the motor.

6 Claims, 1 Drawing Sheet

RECIPROCATING PUMP COUPLING

This is a continuation of application Ser. No. 308,040 filed Feb. 8, 1990, now abandoned.

BACKGROUND OF THE INVENTION

Couplings for the joining of a pump shaft to an air motor or hydraulic motor output shaft are well known in the art. Such couplings typically consist of a knob on the end of the pump shaft having an underside shoulder which extends radially outwardly at right angles to the axis of the shaft. This shoulder is gripped by a two piece annular collar which is in turn drawn upwardly by a nut which screws to the motor shaft. Since constructions have typically been less than optimal as the substantial alternating loads imposed by the motor shaft can lead to failure of the coupling in extreme circumstances.

It is therefore an object of this invention to provide a coupling design which provides enhanced ability to handle increased loads while at the same time remains easy to assemble and disassemble as well as to manufacture.

SUMMARY OF THE INVENTION

The pump shaft is provided with a knob at the end adjacent the motor shaft, the knob having an outside diameter and a coupling area located between said knob and the main part of the shaft. The knob and the coupling area are connected by a shoulder which has an oblique, ideally 45 degree angle relative to the axis of the shaft.

A nut is provided which at one end has threads which engage those on the motor shaft and on the other end having a shoulder of decreased diameter and having an inner diameter slightly greater than the outside diameter of the knob. The shoulder between the two diameters contacts an outer shoulder on a two piece annular collar which fits about the knob and coupling area. The collar has an upper shoulder which engages the pump shaft shoulder and has an angle approximately the same as the pump shaft shoulder except the angle is slightly less, the amount of mismatch between the angles desirably being ½ degree.

By threading the nut upwardly, the end of the pump shaft contacts the end of the motor shaft and the nut is tightened until the pre-load between the two shafts exceeds the alternating load which is imparted during the operation of the pump.

These and other objects and advantages of the invention will appear more fully from the following description made in conjunction with the accompanying drawings wherein like reference characters refer to the same or similar parts throughout the several views.

A BRIEF DESCRIPTION OF THE DRAWINGS

DESCRIPTION OF THE PREFERRED EMBODIMENT

Figures 1, 2, 3:
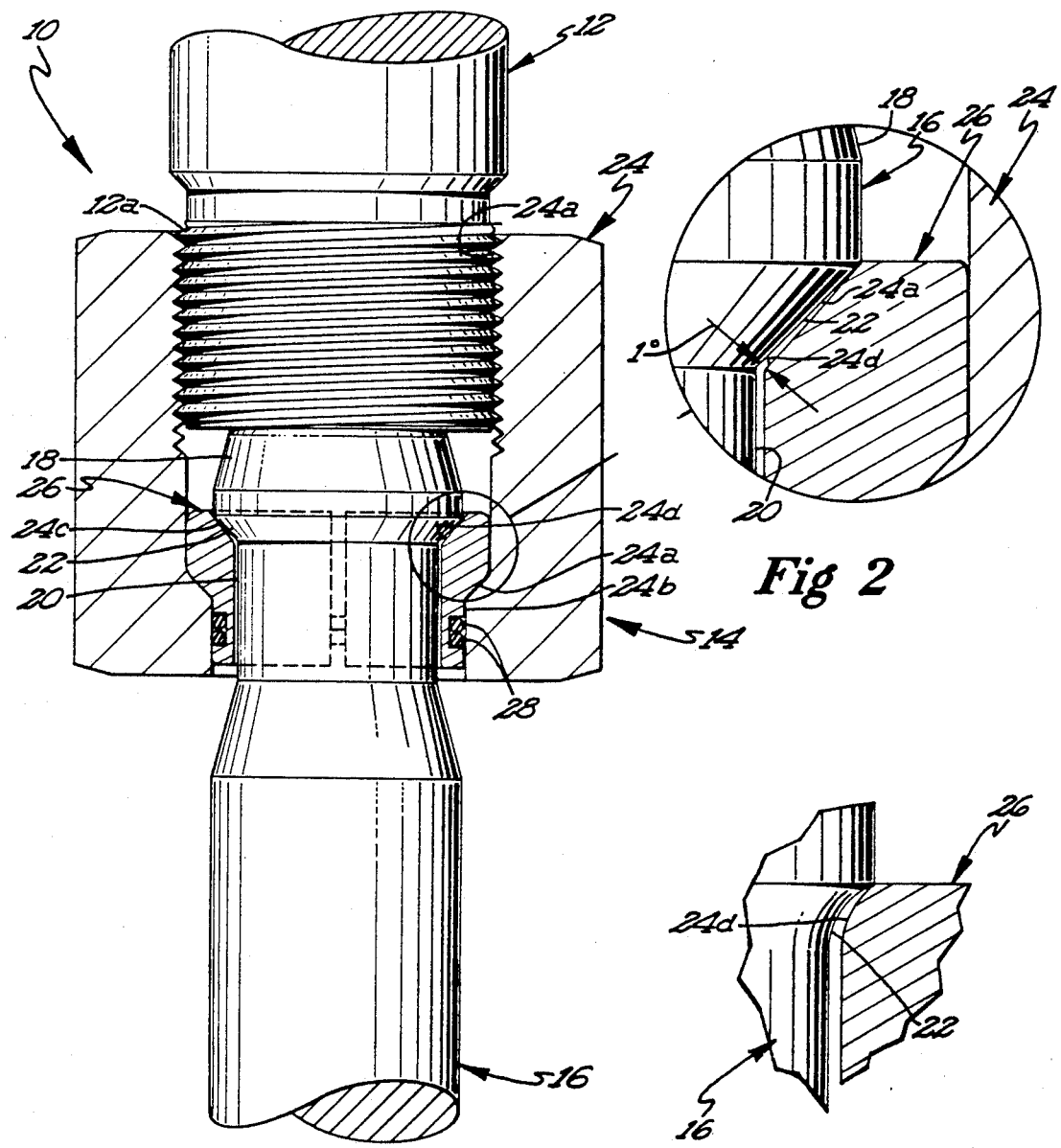
FIG. 1 shows a cross sectional view of the coupling of the instant invention.
FIG. 2 is an exploded view showing the contact between the collar and the knob on the end of the pump shaft.
FIG. 3 is an exploded view of an alternative embodiment of the same area as FIG. 2.

The instant invention, generally designated 10, is designed for use in a pump having an air motor or other reciprocating motor shaft 12 which is connected by a coupler 14 to a pump shaft 16. Pump shaft 16 has a knob 18 located at one end thereof. Also located at one end of pump shaft 16 is a coupling area 20 having a reduced diameter relative to that of knob 18. A transitional shoulder 22 connects knob 18 and coupling area 20, shoulder 22 having an oblique angle relative to the axis of pump shaft 16 which is between 30 and 60 degrees and ideally about 45 degrees as shown.

A nut 24 is provided which has a threaded area 24a at the upper end thereof and an area of reduced diameter 24b at the lower end thereof. As can be seen in FIG. 1, reduced diameter 24b is less than the diameter of threaded area 24a and yet slightly larger in diameter than that of knob 18 on pump shaft 16. While nut 24 is shown as a traditional generally cylindrical nut, it can be appreciated that other structures are capable of performing the same structural function equally well, and the word nut is intended to encompass such other structures. For instance, the "nut" 24 may be formed of two pieces, one which threads to motor shaft 12, and a second piece which engages the collar and fastens (with one or more bolts) to the first piece. Needless to say, the cylindrical shape is a matter of choice.

A two piece (in the preferred embodiment) longitudinally split annular collar 26 is provided which has an outer shoulder 26a for mating with shoulder 24c of nut 24. Of course, such a collar may be formed of any number of pieces from a unitary construction on up. Similarly, collar 26 is provided with an inner shoulder 24d which is designed to contact shoulder 22 of pump shaft 16. As can be seen particularly in FIG. 2, there is a slight angular mis-match between shoulders 22 and 24d such that the angle of shoulder 24d relative to pump shaft 16 is slightly less than that of shoulder 22. This angular mis-match is preferably in the range of 0–2 degrees and having an optimum value of about ½ degree.

One or more flexible connecting members 28 may be used to hold the two halves of annular collar 26 together. Thus, in assembly of the device, nut 24 is initially dropped over pump shaft 16 and allowed to slide downwardly below the position shown in FIG. 1. Thence, the two halves of annular collar 26 are assembled in the position shown in FIG. 1 about knob 18 in coupling area 20 and optionally secured to one another by flexible connecting member 28. Connecting member 28 may be one or more o-rings, wire clips or any sort of similar device which will hold the halves of collar 26 together during assembly. No significant structural demands are made on connecting member 28.

Thence, nut 24 is raised and threads 24a of nut 24 engage the threads 12a on motor shaft 12 and nut 24 is tightened until shoulder 26a of collar 26 is contacted by shoulder 24c of nut 24 and shoulder 24d of collar 24 contacts shoulder 22 of pump shaft 16. Nut 24 is then further tightened such that the ends of motor shaft 12 and pump shaft 16 contact one another as shown in FIG. 1 and attain a pre-load such that the pre-load is greater than the load which will be imposed during operation during motor shaft 12 on pump shaft 16. Such pre-load in conjunction with the increased area afforded by the obliquely angled shoulder 22 and the angular mis-match between the collar and shoulder 22 allow greatly enhanced load carrying ability compared to prior art couplings.

It is contemplated that various changes and modifications may be made to the coupling without departing from the spirit and scope of the invention as defined by the following claims.

What is claimed is:

1. A coupling for a reciprocating pump imposing a substantial alternating load and comprising:
   a motor shaft having a threaded end;
   a pump shaft comprising:
   first and second ends;
   a longitudinal axis, said shafts being aligned adjacent one another colinearly along said axis;
   a knob having an outside diameter at said pump shaft first end;
   a coupling area having a diameter less than that of said knob and said coupling area being located between said first and second pump shaft ends adjacent said knob; and
   a pump shaft shoulder connecting said knob and said coupling area, said shoulder having an oblique angle of between about 30 and 60 degrees relative to said axis;
   a generally cylindrical nut having an overall inside diameter greater than said knob outside diameter and comprising;
   a nut first end threadedly engaging said motor shaft;
   a nut second end having a diameter less than that of said nut first end; and
   a nut shoulder between said nut first and second ends and having an oblique angle relative to said axis; and
   an annular collar formed by at least two longitudinally split pieces and comprising;
   an outer shoulder for mating with said nut shoulder;
   an inner shoulder for mating with said pump shaft shoulder, said inner shoulder having an oblique angle relative to said axis wherein said collar inner shoulder has an angle relative to said axis of between approximately 0 and 2 degrees less than the angle of said pump shaft shoulder relative to said axis:
   a first collar outer diameter greater than said diameter of said nut second end; and
   a second collar outer diameter less than said first collar outer diameter, said outer shoulder being located between said first collar outer diameter and said second collar outer diameter.

2. The coupling of claim 1, wherein said pump shaft shoulder has an angle relative to said axis of approximately 45 degrees.

3. The coupling of claim 1 wherein said collar inner shoulder has an angle relative to said axis of approximately ½ degree less than the angle of said pump shaft shoulder.

4. The coupling of claim 1 wherein a relationship is formed by the dimensions of said nut, motor shaft threaded area, collar and knob such as to allow tightening of said nut to provide a contact force between said pump shaft first end and said threaded end greater than the alternating load of said pump.

5. The coupling of claim 1, wherein said collar inner shoulder and said knob shoulder comprise curved surfaces.

6. The coupling of claim 5 wherein said curved surfaces contact one another adjacent said knob outside diameter.

* * * * *